United States Patent [19]

Pyle

[11] 4,030,517

[45] June 21, 1977

[54] CONDENSATE VALVE ASSEMBLY

[75] Inventor: Kenneth E. Pyle, Marine City, Mich.

[73] Assignee: Reef-Baker Corporation, Marine City, Mich.

[22] Filed: Dec. 15, 1975

[21] Appl. No.: 640,471

Related U.S. Application Data

[62] Division of Ser. No. 546,736, Feb. 3, 1975, Pat. No. 3,977,426.

[52] U.S. Cl. .......................... 137/203; 137/614.14; 137/614.21; 251/294
[51] Int. Cl.² ..................... F16T 1/00; F16K 31/126
[58] Field of Search ............ 137/203, 204, 614.14, 137/614.21; 251/294

[56] References Cited

UNITED STATES PATENTS

| | | | |
|---|---|---|---|
| 2,591,432 | 4/1952 | Hoerner | 137/204 X |
| 2,739,605 | 3/1956 | Smith | 137/204 |
| 3,004,549 | 10/1961 | Temple | 137/204 |
| 3,406,700 | 10/1968 | Beazer | 251/294 X |
| 3,783,889 | 1/1974 | Pyle | 137/204 |

Primary Examiner—Alan Cohan
Attorney, Agent, or Firm—Whittemore, Hulbert & Belknap

[57] ABSTRACT

A condensate valve comprising a housing having a chamber for the accumulation of liquid and an outlet passage from the chamber leading to a central chamber from which liquid is discharged to the atmosphere. A double-acting valve member controls the outlet passage. A diaphragm closes the central chamber and separates it from a pressure chamber. A manually operable device is provided for holding the valve member in a shut-off position or in a position to drain the condensate valve. A separate annular heater assembly is disposed upon the housing in encircling relation to the liquid accumulation chamber to prevent freezing.

1 Claim, 4 Drawing Figures

CONDENSATE VALVE ASSEMBLY

This is a division, of application Ser. No. 546,736, filed Feb. 3, 1975 now U.S. Pat. No. 3,977,426.

BACKGROUND AND SUMMARY OF THE INVENTION

This invention represents an improvement on the valve construction disclosed in my U.S. Pat. No. 3,783,889.

My improved condensate valve is generally of simplified construction in which the housing consists of upper and lower body parts, each preferably in the form of a one-piece casting.

The condensate valve of the present invention has an improved bibb valve member formed of two identical half sections each of integral one-piece construction and preferably of molded rubber.

In accordance with the present invention the diaphragm may be of a single type diaphragm but preferably is the double type, that is one consistingl consisting two separable layers. The double type diaphragm provides greater ejection capacity.

Additional features of my invention includes the provision of an improved manual push-button type drain or shutoff device. If desired, a pull-chain type operator may be provided for the device or a lever may be employed to hold the device open for complete bleed down of the system or to hold the device in shut off position.

Figure 1:
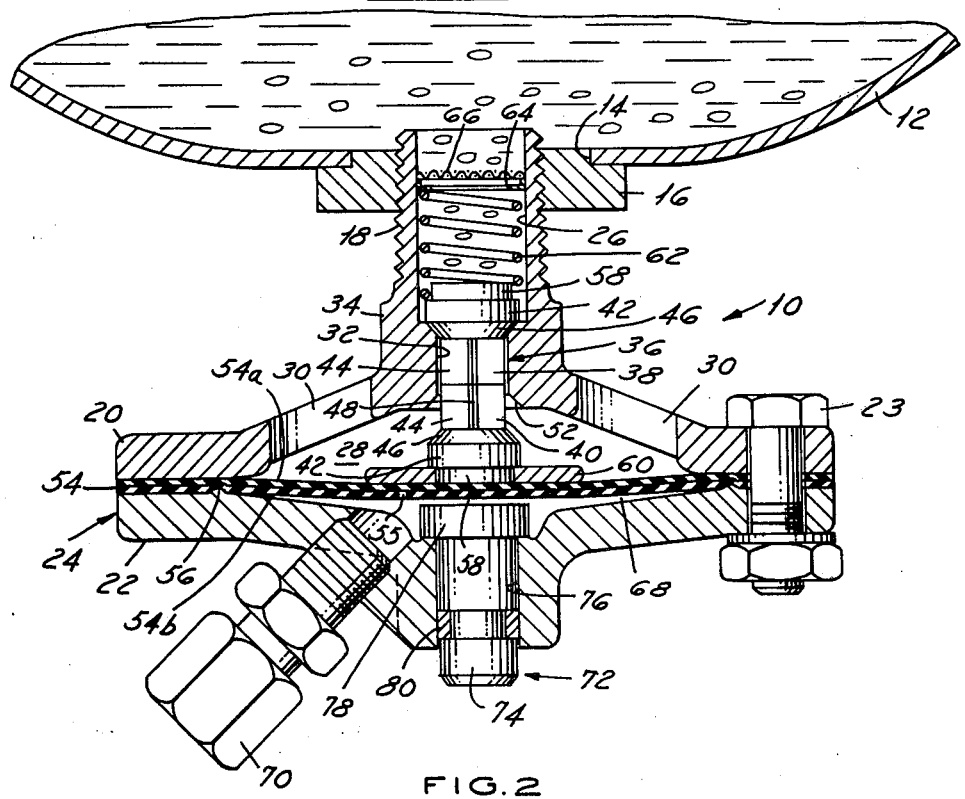
FIG. 1 is a central vertical sectional view of a condensate valve constructed in accordance with my invention and shown connected to an air or gas supply tank.

The condensate or drain valve is shown connected to an air or gas supply tank to remove condensate therefrom. The tank may for example be of the type used on vehicles to provide a supply of compressed air for operating the brakes. However, it should be understood that the condensate valve is useful in connection with other types of tanks and for other purposes whether or not the tank contains air or gas and whether or not the pressure in the tank is maintained above atmospheric pressure.

Referring now more particularly to the drawings, the valve is generally designated 10 and is shown as being screw threaded into an opening in the bottom of the tank 12 which may be adapted to contain a supply of air or gas to be used for diversified purposes, which supply of air or gas is preferably under a pressure above atmospheric pressure. Specifically, the bottom wall of the tank has an opening 14 in which is secured the internally threaded member 16. The hollow or tubular upwardly extending portion or stem 18 of the upper body 20 of the valve housing threads through the member 16 into the opening in tank 12. Thus condensate in tank 12 may drain into the condensate valve through the stem 18 of the valve housing.

The condensate valve 10, as already stated, has an upper body 20 of which the upwardly extending portion or stem 18 is an integral part. It also has a lower body 22. Preferably the upper and lower bodies 20 and 22 are each one-piece metal castings and are secured together by fasteners 23. Essentially these upper and lower bodies 20 and 22 make up the housing of the valve which is designated 24.

The upwardly extending portion or stem 18 is of uniform circular internal cross section from its open upper end downward throughout a major portion of its extent to define a liquid accumulation chamber 26. An outlet is provided for exhausting liquid from chamber 26, such outlet including a central chamber 28 formed in the lower or main portion of the upper body 20. This main or lower portion is of generally conical form, having the stem 18 extending vertically upward from the center thereof. The upper body 20 has outlet ports 30 which open into the atmosphere or which may lead to suitable conduits for carrying away exhaust liquid from the central chamber 28. A vertical passage 32 extends through the central partition portion 34 from the liquid chamber 26 to the central chamber 28.

A vertically reciprocable double-acting bibb valve member 36 extends through passage 32. The valve member 36 is made up of identical upper and lower bibb halves 38,40 which preferably are not interconnected but merely abut as shown and which therefore are interchangeable with one another. They are held in pressure contact at all times by spring 62 more fully described hereinafter. The bibbs 38,40 forming the valve member 36 are preferably each of one-piece molded rubber construction. Each bibb has an enlarged circular head 42 and a stem 44 of reduced cross section extending axially from the head. The shoulder of the head adjacent the stem is tapered so as to be conical in form to provide a sealing surface 46. The stem of each bibb is polygonal in cross section, in this instance square, so as to allow liquid to flow through the passage 32 from the liquid chamber 26 to the central chamber 28 when the valve member is in an intermediate position between the two limiting positions shown in FIGS. 1 and 2. The corners 48 of the stem between the flat sides are blunted as shown to ride on the wall of passage 32 and guide the valve member when it moves vertically.

Figure 2:
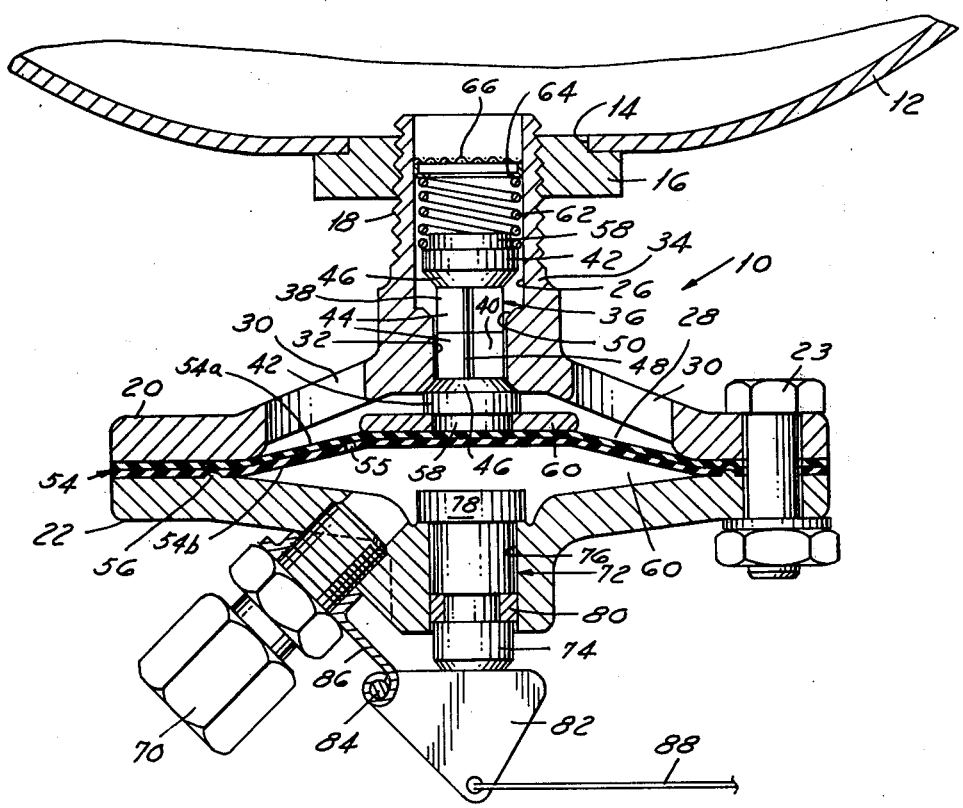
FIG. 2 is similar to FIG. 1 but shows the valve member in a different position. This Figure also shows a pull-chain type control for the manual drain or shutoff device.
Figure 3:
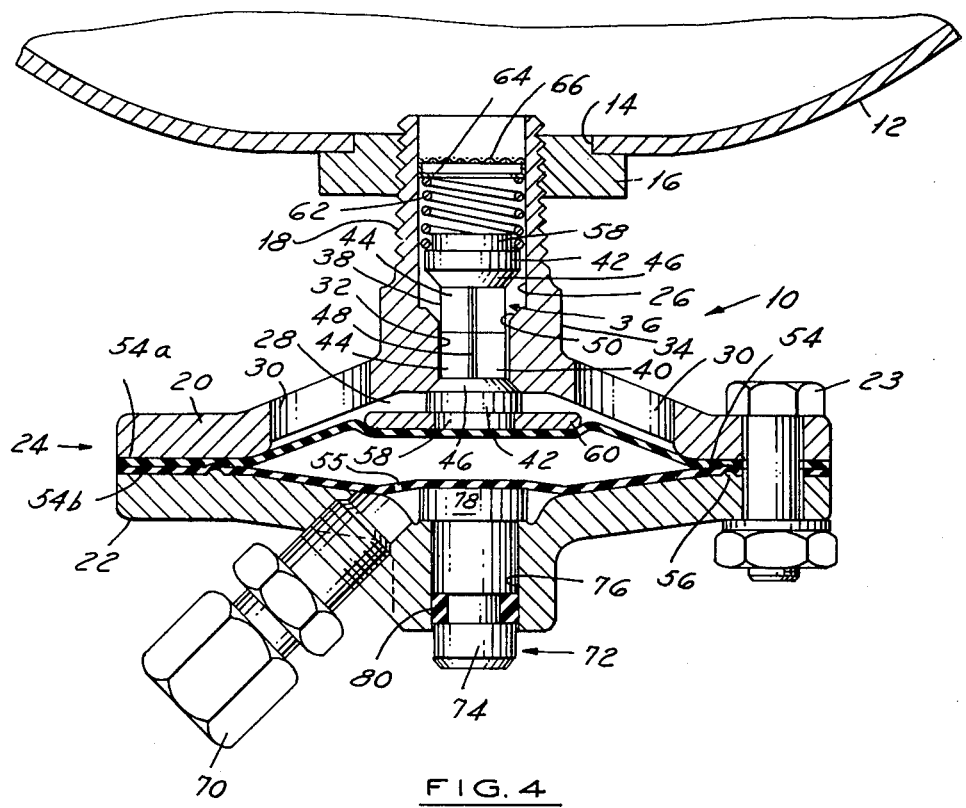
FIG. 3 is like FIG. 2 but shows the layers of the double-type diaphragm separated.

As seen, the bibb head 42 of the upper bibb 38 is disposed in the liquid accumulation chamber 26 and the head 42 of the lower bibb 40 is disposed in the central chamber 28. The central partition portion 34 has an upper annular valve seat 50 and a lower annular valve seat 52. These valve seats 50 and 52 are at the upper and lower ends of the passage 32 and are formed at the same angle as the sealing surfaces 46 of the heads of the valve member for full surface-to-surface sealing contact therewith as shown in FIGS. 1 to 3. It will be apparent that when the valve member is at the lower limit of its movement, as shown in FIG. 1, the sealing surface 46 of the upper valve head engages the seat 50 to prevent the outflow of liquid from the accumulation chamber 26, and that in the upper limit of the valve member the sealing surface 46 of the lower head engages the valve seat 52 likewise to close the accumulation chamber 26 and prevent the outflow of liquid. However, in intermediate positions of the valve member 36, liquid collected in the accumulation chamber 26 may pass through the spaces between the flat sides of the stem of the valve member 36 and the passage 32 to be discharged through the central chamber 28 and ports 30.

The lower boundary of the central chamber 28 of the upper body 20 is defined by a flexible diaphragm 54 which is clamped between the outer margins of the upper and lower bodies 20 and 22 of housing 24. As shown, the outer marginal portion of the upper surface of the lower body has an annular ridge 56 which projects into the diaphragm to form a better seal. The diaphragm may be formed of rubber or rubber-like material which is compressible and forms an adequate seal, also being somewhat elastic. In the present instance, the diaphragm is formed of a woven fabric which is rubber-coated on both sides.

The diaphragm 54 may be of the single or double type depending upon the ejection capacity desired. The diaphragm in this instance is shown as being of the double type, that is, it is comprised of separate upper and lower layers 54a and 54b, for greater ejection capacity. The lower layer has a small metering aperture 55 therein which may have a diameter on the order of about 0.020 inches. The diameter of the orifice depends on the desired ejection capacity, and while this dimension may vary considerably depending upon ejection requirements, it usually will be from about 0.012 inches to about 0.022.

With further references to each of the bibbs or halves 38,40 making up the valve member 36, it will be seen that projecting from each head 42 at the side opposite the stem is a central boss 58 which preferably is circular in form and integrally molded with the bibb. A washer 60 is fitted over the boss 58 of the lower bibb and engages the upper surface of the diaphragm 54. Pressure engagement of the diaphragm against the valve member is therefore spread over the relatively large surface of the washer. The washer on its upper surface engages the shoulder of the head surrounding the boss. The washer may be permanently secured to the bibb but need not be because there is always a pressure engagement between the washer and the diaphragm to hold the washer in place.

The boss on the head of the upper bibb provides a pilot for the compression coil spring 62 which bears down upon the valve member with a yielding pressure. The upper end of the spring is held within the accumulation chamber 26 by a retaining ring 64 which may be an annular split ring pressing outward against the wall of the chamber to hold itself frictionally in place. Preferably a screen 66 is disposed over the top of the retaining ring to filter out impurities which would otherwise enter the condensate valve.

The lower body 22 is generally cone-shaped. A pressure chamber 68 is formed in the upper surface of the lower body 22. The dished shape of this surface prevents rupture of the diaphragm. The upper boundary of the pressure chamber is defined by the diaphragm. A pressure inlet circuit 70 is secured to the lower body 22 and communicates with the pressure chamber 68.

A manual shutoff and drain device 72 is provided. Such device is in the form of a plunger 74 slidable in a vertical passage 76 formed in the thickened central portion of the lower body 22. The plunger has an enlarged head 76 on the upper end disposed within the pressure chamber opposite the center of the diaphragm. The plunger also has a circular groove in which an O-ring seal or the like 80 is provided for sliding contact with the wall of passage 76 to seal the pressure chamber. The plunger 74 may be manually raised from the FIG. 1 position to lift the valve member 36 to its upper limit sealing off the accumulation chamber 26 to shut off the condensate valve, or to lift the valve member to an intermediate position between its upper and lower limits to drain the tank.

FIG. 2 illustrates a pull-chain type operator for the manual shutoff valve comprising a bell crank lever 82 pivoted at 84 to a bracket 86 mounted on the conduit 70. When the pull chain 86 connected to the ball crank is pulled, the bell crank elevates the plunger 74 to the position desired either to shut off or drain the condensate valve.

Figure 4:
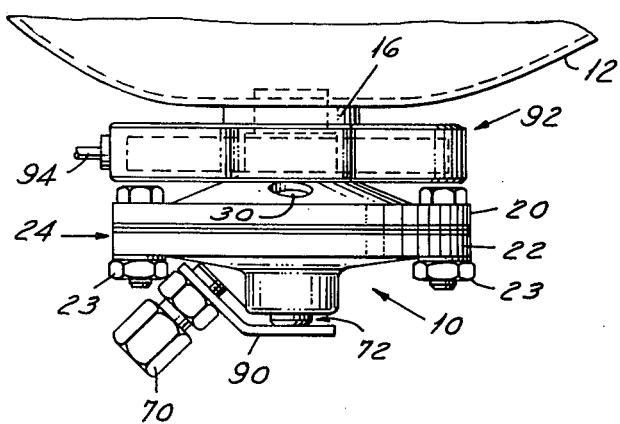
FIG. 4 is an elevational view of the condensate valve on a reduced scale, showing a lever in position to keep the drain open for complete bleed down of the system.

FIG. 4 shows a lever 90 mounted on the conduit 70 having a fixed portion adapted to engage the bottom of the plunger. This fixed portion may extend at the desired angle to hold the plunger either in its shut off or its drain position. The lever is intended to swing on an arc about the axis of the conduit from the operative position shown in FIG. 4 to an inoperative position withdrawn from the plunger.

A heater assembly in FIG. 4 is provided for preventing icing of liquid accumulated in the chamber 30. This heater assembly is designated 92 and is in the form of an annulus. As shown, it rests upon the upper body 20 in encircling relation to the stem portion 18 in which the accumulation chamber 26 is disposed. The heater assembly conventionally may include electric heating elements operated by external wiring 94 and a thermostat set to respond to a predetermined low temperature. The heater assembly 92 preferably is not fixed to the condensate valve but merely rests upon the upper body of the housing. It may be dispensed with in instances where cold weather is not expected. However, it may easily be installed on the valve when desired, as shown, because of its convenient form and construction and merely rests on the valve around the chamber 26.

In use, the condensate valve 10 may be connected to the tank 12 as shown in the drawing. If this valve is used in connection with the air brake system of a vehicle, the line connected to the brake system may also direct pressure into chamber 68 through conduit 70 to raise the diaphragm 54 and hence the valve member 36 from its lower limit shown in FIG. 1 to its upper limit shown in FIG. 2 in which the sealing surface 46 closes on the seat 52 whenever the brakes are applied. Pressure fluid in the chamber 68 will flow slowly through the aperture 55 between the diaphragm layers and separate the lower layer from the upper layer while the upper layer holds the valve member at its upper limit as in FIG 3. Then when the pressure in the pressure chamber is relieved, the spring 62 will return the valve member 36 to its lower limit causing sealing surface 46 to close on seat 50 and again close the liquid chamber 26.

This return of the valve member 36 to its lower limit will be a metered or delayed return movement because of the restricted outflow of fluid from between the diaphragm layers. While the valve member is between its limits, that is during the time it is moving from one limit to the other, liquid in the accumulation chamber 26 will be discharged through the passage 32, chamber 28 and outlet ports 30. The metered or delayed return movement of the valve member to its lower limit caused by the metering orifice 55 increases the time during which liquid can discharge from the accumulation chamber. Accordingly, the ejection capacity of the valve is increased by this metering action. A relatively large orifice, of 0.022 inches diameter for example, will produce only a brief delay, one of perhaps 1 or 2 seconds, whereas a small orifice of about 0.012 inches diameter will produce a longer delay of perhaps 4 or 5 seconds. The longer the delay, the greater the ejection capacity. However, too long a delay caused by too small an orifice may dissipate tank pressure excessively.

The preferred construction having an aperture 55 on one layer of a double-type diaphragm provides increased ejection capacity. Obviously the valve will function as a condensate valve but of reduced ejection capacity if the aperture is eliminated from one of the diaphragm layers or if a diaphragm of the single type is employed.

In some instances, the condensate valve 10 may be used with a tank whose pressure is maintained by an air compressor which has a regulating or unloading device to operate a relief valve when the regulated pressure in the tank has been reached. Air from the unloading device would then be piped to the pressure chamber 68 of the condensate valve to raise valve member 36 to its upper limit. Then when the tank pressure drops below the regulated air pressure, the air from the compressor would no longer be directed to the pressure chamber 68 but would be delivered to the tank to build up its pressure again. Hence the pressure in the chamber 68 would be relieved so that the valve member 50 might return by spring pressure to the illustrated position.

It should be noted that the valve member 36 operates twice each time air under pressure is applied to the pressure chamber 68, once when the air pressure is initially supplied to the chamber and a second time when it is relieved. During each such interval of movement of the valve member 36 liquid in the chamber 26 is relieved. It will be understood of course that the aperture 55 meters or retards the movement of the valve member 36 in one direction only, that is from its upper to its lower limit, not in the reverse direction.

The bibb halves 38 and 40 making up the valve member 36 are identical and interchangeable, as stated. The upper bibb half 38 may be removed and replaced through the open upper end of the upwardly extending portion or stem 18 of the upper body 20 when the valve is separated from the tank 12 and the retaining ring 64 and screen 66 are removed from the liquid chamber 26. The lower bibb half 40 may be removed through the central chamber 28 upon release of the fasteners 23, separation of the upper and lower housing bodies 20 and 22 and removal of diaphragm 54.

What I claim as my invention is:

1. A condensate valve comprising a housing, an open-top liquid chamber in the upper portion of said housing for the accumulation of liquid, a liquid inlet to said liquid chamber, a second chamber in said housing beneath said liquid chamber having an outlet port, said housing having a partition separating said chambers, a passage extending downward through said partition from said liquid chamber to said second chamber, a valve member reciprocable in said passage, said valve member having a first sealing portion disposed in said liquid chamber and having a second sealing portion disposed in said second chamber, said first and second sealing portions being larger in diameter than said passage, said partition having valve seats at opposite ends of said passage, said sealing portions being engageable with said valve seats at the opposite limits of movement of said valve member to close said passage against the flow of liquid from said liquid chamber, said valve member between said sealing portions being so formed relative to said passage as to allow liquid to pass from said liquid chamber to said second chamber when said valve member is between its opposite limits, a flexible diaphragm defining the bottom of said second chamber, a fluid pressure chamber in said housing beneath and separated from said second chamber by said diaphragm, said valve member being movable by said diaphragm to its upper limit in response to fluid pressure in said pressure chamber, removable spring means in said liquid chamber for moving said valve member to its lower limit when the pressure in said pressure chamber is relieved, said housing comprising an upper part having said liquid chamber, said second chamber and said partition, a lower housing part having said pressure chamber, means removably securing said upper and lower housing parts together, said diaphragm being marginally clamped between said upper and lower housing parts, said valve member comprising upper and lower separable parts held in abutting relation by said spring means and said diaphragm, said upper part of said valve member having said first sealing portion and said lower part of said valve member having said second sealing portion, said valve member between said sealing portions being in the form of an elongated stem of reduced cross-section relative to said sealing portions, said upper part of said valve member being an integral piece composed of said first sealing portion and the upper end portion of said stem, said lower part of said valve member being an integral piece composed of said second sealing portion and the lower end portion of said stem, said upper part of said valve member being removable upon removal of said spring means through the open top of said liquid chamber and the lower part of said valve member being removable upon separation of said housing parts and removal of said diaphragm, a drain or shutoff device comprising a plunger reciprocably mounted on said lower housing part beneath said valve member capable of raising said diaphragm to raise said valve member to its upper limit or to an intermediate position between its upper and lower limits, and means for raising said plunger including a bell crank lever pivoted on said lower housing part, and a pull member for pivoting said bell crank lever.

* * * * *